United States Patent [19]
Mollenauer

[11] 3,970,960
[45] July 20, 1976

[54] BROADLY TUNABLE CONTINUOUS-WAVE LASER USING COLOR CENTERS

[75] Inventor: Linn Frederick Mollenauer, Colts Neck, N.J.

[73] Assignee: Bell Telephone Laboratories, Incorporated, Murray Hill, N.J.

[22] Filed: Mar. 3, 1975

[21] Appl. No.: 554,467

Related U.S. Application Data

[63] Continuation-in-part of Ser. No. 438,200, Jan. 31, 1974, abandoned.

[52] U.S. Cl. .............................. 331/94.5 F; 330/4.3
[51] Int. Cl.² .......................................... H01S 3/16
[58] Field of Search..................... 331/94.5; 330/4.3; 350/160; 340/173

[56] References Cited
UNITED STATES PATENTS

| | | | |
|---|---|---|---|
| 3,447,138 | 5/1969 | Carson et al........................ | 340/173 |
| 3,753,148 | 8/1973 | Billman.............................. | 331/94.5 |

OTHER PUBLICATIONS

Fritz et al., Laser Effect in KCL with $F_A(Li)$ Centers, Solid State Communications, vol. 3, No. 3, (1965), pp. 61–63.

Physics of Color Centers, Edited by Fowler, Academic Press, N.Y., (1968), pp. 182–242.

Bloom, Modes of a Laser Resonator Container Tilted Birefringent Plates, JOSA, vol. 64, No. 4, (Apr. 1974), pp. 447–452.

*Primary Examiner*—William L. Sikes
*Attorney, Agent, or Firm*—W. L. Wisner

[57] ABSTRACT

Broadly tunable infrared lasers analogous to dye lasers operating in the visible spectrum are provided by significant improvements upon an $F_A(II)$ color center laser previously demonstrated in a limited way. The improvements include techniques for also using $F_B(II)$ and $F_2$ $^+$color centers and include substantially increased concentrations of the F-centers in regions of pumpable geometry, judicious choice of pumping frequencies and powers and variable, frequency-selecting resonators that are capable of producing oscillation anywhere in the color center fluorescence bands. All solid-state cooling by means of contact between the crystal and a solid heat sink is provided in a way that provides the optical quality needed for efficient operation and for greatest tuning bandwidth of the laser. Use of the color centers in distributed feedback devices is described.

14 Claims, 18 Drawing Figures

FIG. 6A
$F_A$ (II) NORMAL CONFIGURATION

FIG. 6B
$F_A$ (II) RELAXED CONFIGURATION

FIG. 7
$F_2^+$ CONFIGURATION

FIG. 8

FIG. 9A
$F_B$ (II) NORMAL CONFIGURATION

FIG. 9B
$F_B$ (II) RELAXED CONFIGURATION

FIG. 12

BROADLY TUNABLE CONTINUOUS-WAVE LASER USING COLOR CENTERS

CROSS-REFERENCE TO RELATED APPLICATION

This application is a continuation-in-part of my copending patent application, Ser. No. 438,200, filed Jan. 31, 1974, assigned to the assignee hereof, and now abandoned.

BACKGROUND OF THE INVENTION

This invention relates to coherent radiation sources of the type that are capable of continuous-wave, broadly tunable or pulsed operation and particularly such systems having those characteristics in the infrared portion of the optical spectrum.

The advent of the dye laser has produced substantial changes both in the approach to study of materials and in applied research for future optical display and data processing systems and, more distantly, for future optical communication systems. Because of the tunability of some dye lasers throughout the visible portion of the spectrum, applied research efforts on nonlinear optical coherent sources for tunable radiation in the visible spectrum have been de-emphasized.

Nevertheless, in the laboratory study of new materials and similar spectroscopy uses, tunable infrared coherent radiation is still provided by tunable nonlinear optical oscillators. Those nonlinear optical oscillators are extremely complex, are difficult to adjust and operate and are very costly. At present, there is no broadly accepted alternative in the nature of a dye laser for the infrared portion of the spectrum.

BRIEF SUMMARY OF THE INVENTION

According to my invention, the need for a cheaper, more easily used source of tunable infrared radiation is satisfied by a color center laser incorporating substantial improvements over the only previously disclosed color center laser, the improvements including techniques for using $F_B(II)$, $F_2^+$ and $F_A(II)$ color centers.

For any of these color centers, primary features of my invention include particularly an arrangement for solid-state cooling of the active medium, and appropriate pumping frequencies, polarizations and powers and variable, frequency-selective resonators. Solid-state cooling is cooling by conduction to a contacting solid body.

It is one advantage of my laser that its extremely broad usable bandwidth, which is made continuously available by the foregoing improvements, can also be used for the generation of extremely short infrared pulses or for highly efficient fixed single-frequency oscillations.

It is one aspect of my invention that the foregoing improvements are based in large part on my recognition of the possibility, and on my definitive experimental demonstration, that such a color center laser has a truly homogeneous broadened laser line, whereas the prior art left little promise of this with its ambiguous speculations and contradictory assertions. For example, see the article by B. Fritz et al, *Solid-State Communications*, Volume 3, page 61 (1965) and Chapter 3 written by F. Lüty in the book *Physics of Color Centers* edited by W. B. Fowler, Academic Press, New York (1968). The latter merely notes inconsistency with the common type of inhomogeneous broadening, but sees the appearance of satellite lines as discouraging with respect to homogeneous broadening. In other words, despite the need for an infrared equivalent of the dye laser, those prior teachings did nothing to encourage attention to application of color centers or to color center lasers, in particular.

Another aspect of my invention is based upon my discovery of the possibility of broadly tunable, efficient continuous-wave laser action throughout the range from about 0.9 $\mu$m to about 3.3 $\mu$m by employing $F_A(II)$ centers caused either by lithium or sodium as doping impurities, $F_B(II)$ centers and $F_2^+$ centers. This aspect of my invention in my parent application involved the use of $F_A(II)$:Li centers, as set out in my above-identified parent application.

Further advantages reside in the apparent absence of bleaching or aging effects, in appropriate configurations, quite in contrast to the intractable bleaching in organic dyes. Also, the threshold optical pump power is quite low, on the order of 30 times less than that required for the most efficient dye lasers.

It is one feature of my invention that it is made compatible with future integrated optical circuits by its use of mainly solid-state cooling. The active medium can thus be deposited directly on a substrate with substantially similar lattice constants. In the versions more amenable to a laboratory setup, for example for spectroscopy, a weak spring clip provides a slip-fit mounting of an active platelet to a cold finger through which a hole is provided to allow the pumping beam to pass through the active platelet at the Brewster's angle.

Another feature of my invention is based on the recognition that the pump band of the $F_B(II)$ centers overlaps that of the interfering $F_A(I)$ and $F_B(I)$ centers, which always coexist with the $F_B(II)$ centers, but that the type I centers can be effectively "bleached" or rendered non-interfering by aligning them both along a common 100 axis by strong pumping by polarized light when the crystal is at or near room temperature. The $F_B(II)$ centers are then pumped with light polarized at right angles to the {100} axis.

According to still another feature of my invention, the $F_2^+$ center is employed by pumping only the lowest energy absorption band. This pumping results in the highest energy conversion efficiency and, more importantly, avoids the creation of excited species that would reabsorb the emitted $F_2^+$ radiation.

According to more specific features of my invention, the concentration of $F_A(II)$ centers, in cases using those centers, is made to be at least $1 \times 10^{17}$ centers per cubic centimeter; and the pumping source is selected to match one of the broad absorption bands of the color centers. If a matching pump source is available, the lowest frequency band is preferred. For $F_A(II)$ color centers in potassium chloride (Li$^+$-doped) this lowest-frequency absorption band is in the red portion of the visible spectrum.

With the provision of all the foregoing features in a color center laser using a lithium-doped potassium chloride (KCl) crystal, continuous-wave laser action has been demonstrated and has been continuously tuned over the wavelength range from 2.5 to 2.9 micrometers. Laser action was obtained for crystal temperatures up to about 200°K.

In an improvement of an $F_A(II)$ center laser according to my invention, the active crystal is oriented with its {110} axis at an acute angle to the pump beam direction and lying in the plane defined by the pump beam direction and pump beam polarization, in order to pump centers of all three orthogonal orientations, {001}, {010} and {100}, and thereby avoid bleaching effects.

Advantageously, the form of resonator for these new lasers has now been shown to be unimportant, except for the provision of solid-state cooling. Thus, one may employ either the folded resonator of U.S. Pat. No. 3,731,224 issued May 1, 1973 to A. Dienes et al., distributed feedback technique of U.s. Pat. No. 3,760,292 issued Sept. 18, 1973 to H. W. Kogelnik et al., as well as those shown in my above-cited copending parent patent application and many others.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENTS

The first four figures are as shown in my above-cited parent patent application.

Figure 1:
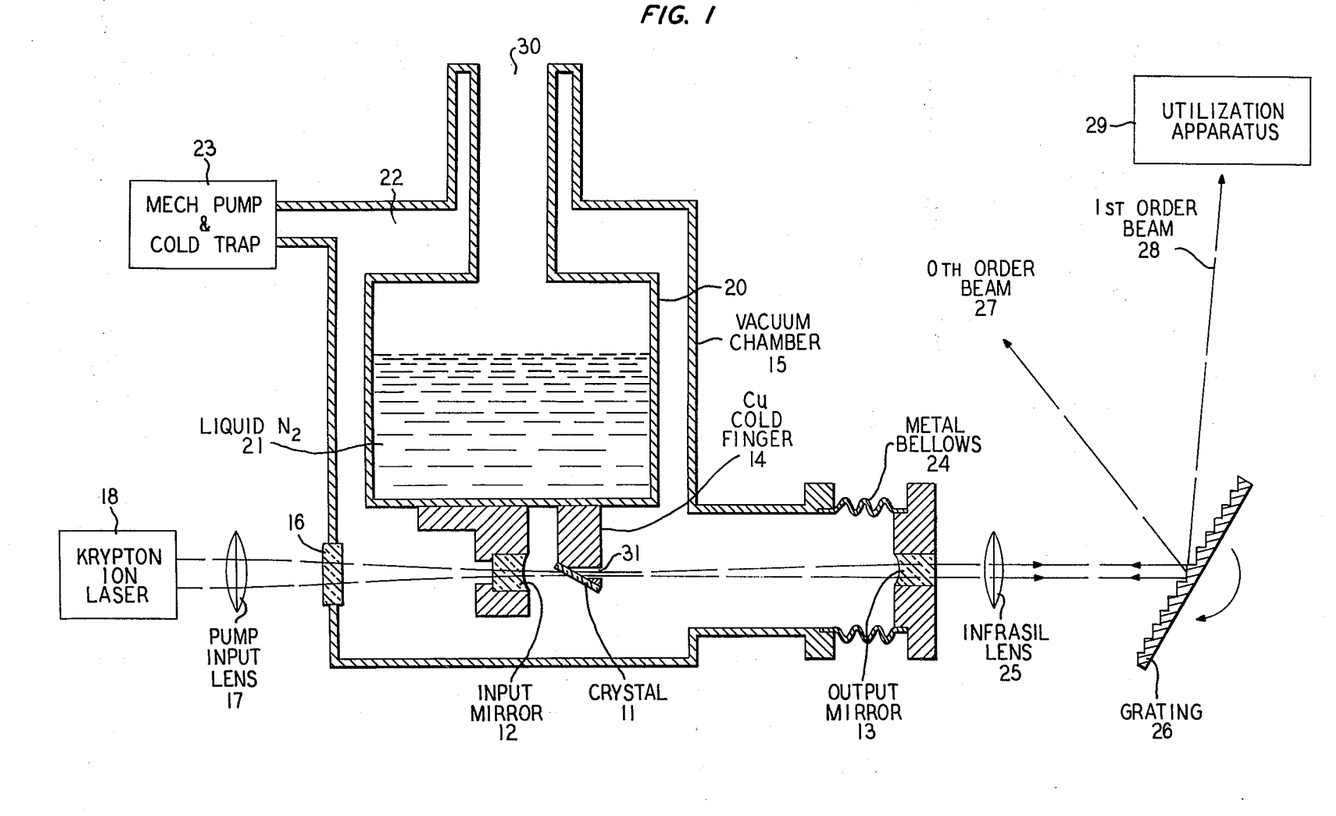
FIG. 1 is a partially pictorial and partially block-diagrammatic illustration of the basic embodiment of my invention.

An experimental laboratory version of my invention essentially according to the pictorial diagram shown in FIG. 1 was used to demonstrate continuous-wave laser action in a lithium-doped ($Li^+$) potassium chloride (KCl) crystal containing $F_A(II)$ color centers. The crystal 11 was mounted on a copper cold finger 14 at the Brewster's angle with respect to the pumping beam from a Krypton ion laser 18 operating at 6471 A and was disposed in an optical resonator, including the input mirror 12 which passed the pumping beam and an output mirror 13 which passed the stimulated emitted coherent radiation. Also an integral part of the resonator was the low-loss optical path provided through the cold finger 14, that is, channel 31 adjacent the central portion of crystal 11. A highly transparent infrasil lens 25 and the diffraction grating 26, which directed a substantial portion of the first order beam of the stimulated coherent radiation back toward the crystal 11, formed an additional resonator with input mirror 12. Lens 25 and grating 26 could also be viewed just parts of one compound resonator with mirrors 12 and 13; their role was particularly to facilitate tuning. The remaining portion 28 of the first order beam was received in a desired utilization apparatus 29. In actual laboratory usage, the apparatus 29 would include a sample under study and a spectrometer; but, in my experiments, it included a high resolution monochrometer and an appropriate detector for power measurements.

The crystal 11 was in the form of a platelet with its thin dimension, about 1 to 2 millimeters, traversed by the pumping beam and was disposed, together with the cold finger 14, mirrors 12 and 13 and their associated mounts in a vacuum chamber 15 into which the pumping beam passed through the infrared-transmitting window 16. The vacuum chamber 15 was evacuated by the mechanical pump 23 which included a cold trap of conventional type. The cryogenic reservoir 20 was an involuted portion of the exterior of vacuum chamber 15 exposed to the atmosphere through a narrow neck 30 which provided a minimal rate of vaporization of the coolant, typically liquid nitrogen. The vaporization boiling of the coolant maintained the cold finger 14 and crystal 11 at the selected operating temperature. By choosing various coolant media, several operating temperatures were made possible in particular 77°K and 200°K. For example, one such different coolant is a slurry of dry ice and acetone.

Adjustability of the position of output mirror 13 relative to input mirror 12 (for cavity alignment) was provided by the metal bellows 24. Cross tuning can be achieved solely by rotation of the diffraction grating 26 about an axis parallel to its surface and orthogonal to the direction of the incident laser light.

The laser crystals were prepared as follows: Platelets of the desired thickness ($t$~1–2 mm) were cleaved out of a KCl:Li crystal containing about $10^{18}$ U-centers/cm$^3$. U-centers are made by drifting hydrogen through a KCl crystal containing F-centers. The F-centers were illustratively made by the well-known process of additive coloration, as explained by C.Z. vanDoorn, *Rev. Sci. Instr.*, *32*, 755 (1961). The hydrogen converts F-centers to U-centers. The two opposing large faces, {100} planes, of a platelet were then optically polished. Since the U-centers absorb only in the hard UV, the resultant clarity of the crystal greatly facilitated inspection for surface flaws, strain-induced birefringence, and other possible defects. A fraction of the U-centers were then converted into ordinary F-centers by subjecting the crystal for about 10 min. to 50 kV X-rays, generated by a beam current of 17 ma, with the crystal located ~2 cm from the anode. The resultant F-center concentration was about 1 – 2×10$^{17}$/cm$^3$. Immediately following X-ray treatment, the crystal was loaded into the laser dewar and cooled to about −30°C. The F-centers were then converted to $F_A(II)$ centers by optically pumping the F-center absorption band (in the green) for nearly an hour, at an intensity, $I = 0.1$ $W$/cm$^2$. Finally, the crystal was cooled to 77°K for the laser experiment.

In my early experiments, the optical cavity defined by mirrors 12 and 13 had a separation between the mirrors just a few millimeters shorter than the sum of the radii of the two mirrors, the sum being of the order of 175 mm. For the wavelength range $2.5 \leq \lambda \leq 2.9 \mu m$ the output mirrors 12 and 13 had reflectivities $R \cong 100\%$ and $R \cong 95\%$, respectively. Mirror 12 had a transmission $T > 80\%$ at the pump wavelength 6471 A.

The slip-fit mounting of crystal 11 was found necessary, and no grease or other thermally conductive compound was used, in order not to strain and thereby fracture the crystal by differential thermal expansion or contraction. The crystal 11 was oriented such that the plane common to the laser beam and normal to the crystal faces contained a {110} axis, primarily to avoid affecting the laser mode with a small birefringence induced by the residual strain along that crystal axis.

The beam waist of the stimulated coherent radiation and the pumping beam waist were located at the input face of crystal 11, with an accuracy of about $\pm 0.3$ mm. The radius of the waist of the stimulated radiation at the $i/e^2$ power points, $w_0$ was controlled by adjustment of the mirror spacing. The value of the radius of the beam waist was inferred from a measurement of the corresponding beam radius $w_1$ at the output mirror 13. The two radii are related as follows:

$$w_0 = \frac{\lambda}{\pi w_1} \cdot r_1 \tag{1}$$

From such a measurement, I inferred that $w_0 \sim 80\mu$ for the 50 mW threshold for oscillation, as measured in some of my experiments. Thus, a pump intensity, $I \sim 0.05/(\pi \times 80 \times 10^{-4})^2 = 250$ W/cm² is implied for threshold. The single-pass gain, G, can be calculated from the equation:

$$\ln(G) = \frac{1}{8\pi} \cdot \frac{\lambda^2}{n^2} \cdot \frac{\eta}{1.07(\delta \nu)} \cdot \frac{I}{E}, \tag{2}$$

where we assume that the pump absorption length is short relative to the crystal thickness, where $\lambda$ is the laser wavelength, $n$ the material index, $\eta$ the luminescence quantum efficiency, $\delta \nu$ the full width of the (Gaussian) luminescence band at the half power points, and E the pump photon energy in joules. When the parameters for my laser ($\lambda = 2.7 \times 10^{-4}$ cm, $n=1.5$, $\eta \cong 0.4$, $\delta \nu = 1.5 \times 10^{13}$/sec, $E/e = 1.91$ eV) are inserted into Eq. (2), we obtain $G = 1.026$ for $I = 250$ W/cm²; this compares very well with the required minimum excess gain of 2.5% per pass, if output mirror transmission represents the only significant loss. However, since $w_1$ (and hence $w_0$) is hard to determine with great accuracy, the agreement may be somewhat fortuitous.

Tuning was accomplished in two different ways. In the first attempt, a 1 mm thick sapphire plate was inserted into the cavity between the crystal and the output mirror. The c axis of the sapphire lay in the plane of the plate, and the plate could be rotated about its normal axis. Thus, the plate formed a birefringence tuner similar to that now used in some dye lasers. Unfortunately, since the light passing through the sapphire was not highly parallel, the plate produced considerable astigmatic loss, and operation of the laser was difficult. Nevertheless, we were able to tune the laser from band center at 2.68 $\mu$m to ~2.6 $\mu$m with this scheme.

The external grating 26 shown in FIG. 2 was somewhat more satisfactory. The grating (189 grooves/mm, blazed for 2.8 $\mu$m) acted to enhance the effective reflectivity of the output mirror over a narrow band of wavelengths. As the grating was rotated into adjustment about an axis parallel to its grooves and perpendicular to the laser axis, laser action would suddenly cease at the band center, and would just as suddenly appear at the wavelength determined by the grating. The laser output wavelength $\lambda$, was estimated roughly by measuring the angle of the $1^{st}$ order beam, and was measured more accurately by sending the $0^{th}$ order beam through a Spex Model 1702, ¾ m grating spectrometer. With this arrangement, I was able to tune continuously over the range $2.576 \leq \lambda \leq 2.7850 \mu m$. Outside this range the grating lost control of the laser primarily because of the reflection and absorption losses of the infrasil mirror substrate and infrasil lens. On the other hand, sufficient excess gain was available to have permitted laser action at wavelengths well outside the half-power points of the band. Thus, for an improved cavity and tuner arrangement, it is reasonable to predict laser action at least over the range $2.5 \leq \lambda \leq 2.9 \mu m$.

It is especially significant that I find no apparent bleaching or other damaging effects in the crystal even after many hours of continuous operation. Furthermore, the method of tuning has verified that the luminescence band broadening mechanism is indeed homogeneous, thereby implying the possibility of efficient energy conversion. Thus, the more pessimistic assessments of prior workers have been rebutted.

Figure 2A:
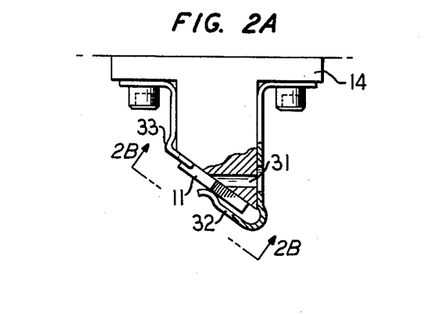
FIGS. 2A and 2B show two views of the slip-fit mounting of the active crystal on an appropriately-arranged cold finger.
Figure 2B:
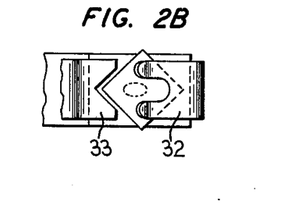

It is believed that the solid-state contact cooling illustrated in more detail in FIGS. 2A and 2B contributed substantially to the very broad usable bandwidth and low pumping power requirements of the laser of my invention. This mounting avoided the degrading effects of coolant fluids flowing in the optical path and at the same time permitted the crystal to be free of birefringence that would otherwise be induced in the crystal by differential thermal contraction.

The degrading effects of a coolant flow past the active crystal are actually two-fold, one direct and one more indirect. First, the fluid motion of the coolant introduces index fluctuations in the optical path for the stimulated radiation. While such fluctuations are tolerated for the active fluid motion of some dye lasers, as a necessary evil attendant to the need to move damaged or bleached dye out of the cavity, the problem has in fact been very discouraging to the development of F-center lasers because of the degree of index fluctuations (bubbles) in coolant fluids. Secondly, it is difficult to maintain a coolant flow or bath of liquid nitrogen or other coolant indefinitely. When the coolant disappears, the atmosphere envelops the crystal; and atmospheric water vapor starts dissolving and degrading the surface of the crystal. In fact, any water vapor in the optical path of the laser greatly increases its losses, because of O-H ion absorption of the radiation. With these problems, other workers could not see long-term significance for the F-center laser.

In contrast, the vacuum about crystal 11 in my arrangement of FIG. 1 is relatively easy to maintain once established, especially with the aid of molecular sieves. Further, no index fluctuations occur in the optical path; and no inherent damage of the active crystal has been discovered. Reduced optical loss due to better optical quality of the crystal yields lower pumping threshold.

All these advantages are directly attributable to the solid-state cooling.

In the side view of the cold finger 14 of FIG. 2A, it is seen that the crystal 11 was held against the cold finger 14 at Brewster's angle directly over an aperture 31 which is drilled through the cold finger 14 in a direction suitable for passing the laser beam. The slip-fit mounting included the weak spring clip 32 and the opposed rigid retaining clip 33 which in the indicated view of FIG. 2B is seen to have had a V-shape appropriate for retaining one corner of the crystal 11 with respect to lateral movements in any direction except toward spring clip 32. In the view of FIG. 2B, it is also seen that spring clip 32 had a U-shaped design so that the pumping beam may enter crystal 11 in alignment with aperture 31 without interference by spring clip 32.

As the crystal 11 contracted twice as fast as cold finger 14 as temperature fell in response to the effect of the coolant, the surface of crystall 11 moved over the contacting surface of cold finger 14 at all points of contact in the general direction of aperture 31. As temperature rose, the reverse movement occurred.

Of course, it should be apparent that not all solid-state cooling of an $F_A(II)$ center laser will require such relative movement.

Figure 3:
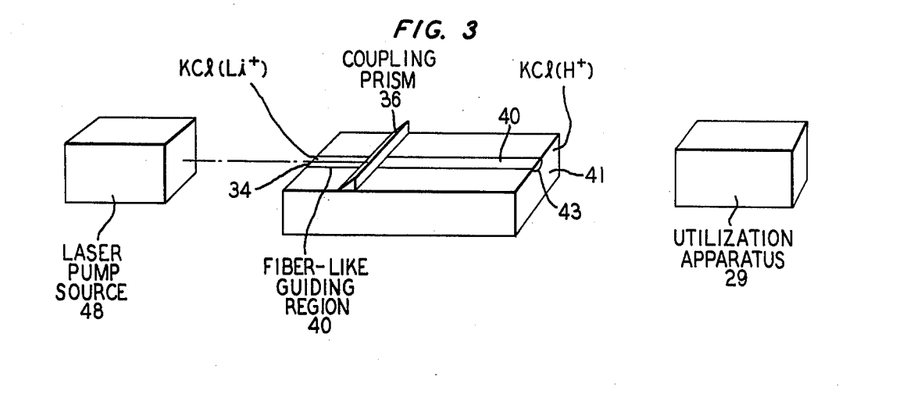
FIG. 3 shows a proposed modified embodiment of my invention compatible with integrated optical circuits.

For example, in reference to FIG. 3, if the active medium 40 is deposited on a similar salt crystal substrate 41, it need have no significant differences in thermal expansion. For example, the substrate crystal 41 could be an alkali halide such as sodium chloride in which lithium does not form color centers like those in potassium chloride. Then the entire assembly may be processed in the same way and lithium drifted throughout both parts without affecting either the guiding properties of the active region 40 or its capability for stimulated emission as compared to substrate 41. In fact, the ends of the region 40 may be made highly reflective for example, ends 34 and 43, in order to form a resonator. In that event the pumping laser light from laser source 48, for example, a krypton xenon ion laser at 6471 A, may be introduced into region 40 through a coupling of prism 36, e.g., a rutile ($TiO_2$) prism, according to the well-known prism-film coupling technique. This technique is disclosed in U.S. Pat. No. 3,584,230 issued June 8, 1971.

The operation of the laser may be explained in more detail with reference to FIG. 4 as follows:

The $F_A(II)$ center in KCl:Li consists of an electron trapped at an anion vacancy, where one of the six nearest neighbor metal ions is an $Li^+$. FIG. 4 shows an energy level diagram. The absorption band contains two broad peaks ($F_{A1}$ and $F_{A2}$ designated diagrammatically by arrows 51 and 52), and spans most of the red to yellow-green range of the visible spectrum. After absorption, the $F_A$ center quickly relaxes via nonradiative transitions indicated by arrows 53 and 54, to a new configuration whose energy levels are shown in the right hand column, and luminescent emission takes place in a band about 0.06 eV wide at the half-power points centered at about 2.68 $\mu$. At liquid He temperatures, the luminescence has a decay time of 80 nsec and a quantum efficiency of 40%; quantum efficiency declines slowly with increasing temperature until it approaches zero at room temperature. Since the terminal state of the luminescence is very short lived ($\sim 10^{-12}$ sec), the $F_A(II)$ center constitutes a nearly ideal 4 level system. Quantum efficiencies approaching unity can be expected eventually. They will provide light-to-light energy conversion efficiencies approaching 25%.

Laser action was also obtained for crystal temperatures well above 77°K. In particular, satisfactory operation was obtained for a cold-finger temperature of $\sim 190°K$, although the threshold was elevated to a value $\sim 3$ times as great as that obtained at 77°K; this result is consistent with the known decrease in $\eta$ with increasing temperature, and with the relative threshold measurements of Fritz and Menke. I made no serious attempt to measure laser threshold as a function of temperature because of the rather poor thermal contact between the laser crystal and the cold finger. I mention this result primarily to emphasize that practical laser operation need not be limited by the availability of liquid nitrogen; operation with dry ice or a small thermoelectric cooler should also be possible.

The cavity configuration shown in FIG. 1 has two severe limitations. First, as $w_0$ is decreased much below 80 $\mu$m, astigmatism contributed by the crystal begins to introduce severe losses; hence the minimum cavity spot size is severely limited. Secondly, a birefringence plate or etalon cannot be introduced into the cavity without incurring severe losses. Fortunately, highly efficient cavity designs for dye lasers employing three mirrors are now known that allow one to substantially overcome both defects. For example, see U.S. Pat. No. 3,731,224, issued May 1, 1973, for the invention of A. Dienes et al. With such a folded cavity, it should be possible to reduce $w_0$ to a value on the order of 10 $\mu$m; then by extrapolation from the present result, the pump required for threshold would be on the order 0f 1 mW. Of course, further reduction in threshold power should be possible through a decrease in output mirror transmission. Hence, efficient operation with a 5 mW He-Ne laser as the pump source is quite plausible. The only practical difficulty might be with the surface quality that is attainable in the polishing of alkali halides. At present, I am using Linde B and pure ethanol on a wool-velvet lap in the last polishing process; the resultant surface can be made essentially scratch free. A suggested detailed polishing technique is that disclosed in U.S. Pat. No. 3,587,196, issued June 28, 1971, for the invention of Frank A. Dunn.

Frequency definition of the $F_A$ center laser may O-H be better than that attainable with the organic dye devices, since here there is no required motion of the amplifying medium, and hence no associated frequency jitter due to index fluctuations. Other $F_A(II)$ centers are also known to exist, namely, the centers in RbCl:Li and RbBr:Li. Although the luminescence bands of these have never been accurately measured, they are known to lie in the 0.4 to 0.5 eV region. The $F_A(II)$ lasers may have a number of significant uses. For example, the KCl:Li laser is ideally suited for tuning through the O1H absorption spectrum. Thus, in addition to the more ordinary chemical analytical uses created by this 2.5–2.9 $\mu$m tuning range, the KCl:Li laser will be uniquely useful as a source for accurately measuring the O-H absorption loss in fused-silica optical fibers. A low amount of O-H ions in the fibers is very important to their use in data processing and communications. Although such losses can be measured with conventional sources in bulk material, a coherent radiation source is required to feed sufficient light power through the fiber for adequate signal-to-noise ratio. Mode-locked, they may provide a source of picosecond pulses suited to the investigation of nonlinear effects and time-resolution studies in narrow-bandgap semiconductors. As a tunable scattering source, and perhaps in other ways, the $F_A(II)$ lasers might prove useful in the investigation of exciton charge droplets in Ge, a currently interesting aspect of physics related to the phenomena of charge distribution in solids.

My laser experiments have so far involved the $F_A(II)$ centers in KCl:Li and RbCl:Li, but similar results are to be expected in a number of other closely analogous centers, such as the recently discovered $F_A(II)$ centers in KF:Li and KF:Na, $F_2^+$ centers in just about any alkali halide host, and $F_B(II)$ centers.

Figure 5:
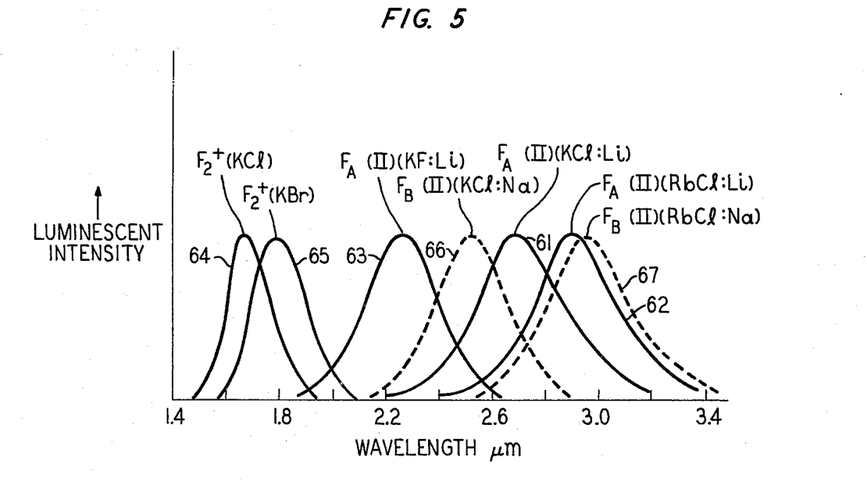
FIG. 5 shows curves of luminescent intensity versus wavelength for differing alkali halides and types of color centers usable according to my invention.

FIG. 5 shows the luminescence bands associated with some of these. Curves 61–63 represent the first three examples of the preceding paragraph. The $F_2^+$ luminescence bands of only a few alkali halides have been shown in FIG. 5 in curves 64 and 65. When other hosts are included, $F_2^+$ covers the range $0.9 \lesssim \lambda \lesssim 2$ $\mu$m. If the majority of these work as expected, color center lasers will cover the rather large and important spectral region $0.9$ $\mu$m $< \lambda < 3.3$ $\mu$m at the very least. The $F_B(II)$ center curves 66 and 67 help fill in this spectrum. This region is of fundamental importance to molecular spectroscopy, pollution detection, fiber optic communications, and the physics of narrow bandgap semiconductors. In fact, it is in terms of this spectral tuning range that the color center lasers have their greatest advantage: organic dyes fail completely for $\lambda \gtrsim 1$ $\mu$m; and the only other tunable sources in the near infrared, the parametric oscillators, are extremely cumbersome and expensive. Thus, color centers may indeed become a most practical and uniquely vital part of laser technology.

Figure 4:
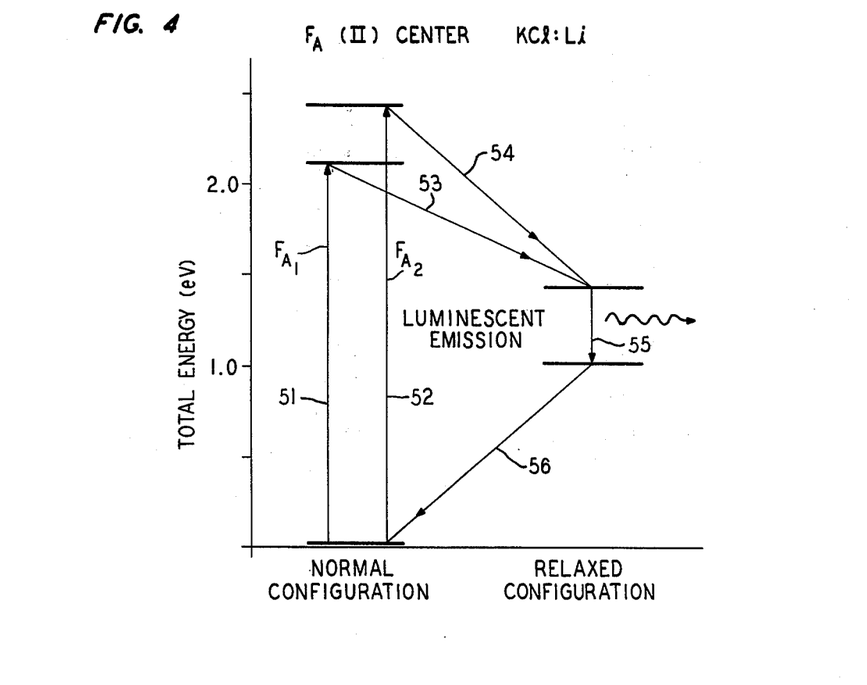
FIG. 4 shows an energy level diagram useful in describing the theory and operation of my invention.
Figure 6A:
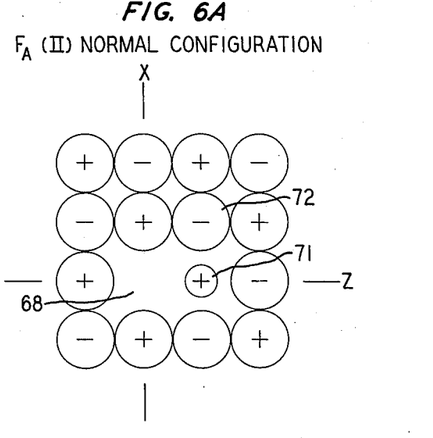
FIGS. 6A and 6B show schematically the normal and relaxed configurations of an alkali halide with $F_A(II)$ color centers, making possible the energy level diagram of FIG. 4.
Figure 6B:
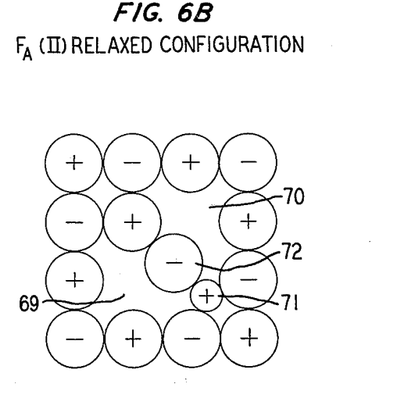

The energy level diagram of an $F_A(II)$ center, shown in FIG. 4, may be more completely understood from the alkali halide crystalline lattice diagrams of FIGS. 6A and B. The normal configuration of FIG. 6A corresponds to the set of levels similarly labeled in FIG. 4 on the left. FIG. 6B corresponds to levels on the right of FIG. 4. The vacancy 68 in FIG. 6A corresponds to a single "potential well"; while the two vacancies 69 and 70 in FIG. 6B correspond to a double "potential well" of the energy of the crystalline system. The small + circle is a metallic ion 71.

In contrast, relaxation of ordinary F-centers consists of a simple expansion of the vacancy, and of a corresponding adjustment in the electronic wavefunction.

Nevertheless, when the ordinary F-center system reaches its relaxed-excited state, the associated electronic wavefunction becomes spatially very diffuse. As a result of the poor overlap between this wavefunction and that of the ground state of the relaxed system, the oscillator strength of the luminescence band is quite small ($f \sim 0.01$). Also, the relaxed-excited state is energetically quite shallow, and hence there exists the possibility of self-absorption into the conduction band of the emitted photons. These two properties taken together make rather unlikely the attainment of a net optical gain in ordinary F-centers and in $F_A(I)$ and $F_B(I)$ centers.

In contrast, the $F_A$ centers of type II relax to a double well configuration shown in FIG. 6B following optical excitation. As our experiments have verified, the type II $F_A$ centers are eminently suited for tunable laser action.

Note that the relaxed $F_A$ (II) center, FIG. 6B, is a radically different system from its unrelaxed counterpart, FIG. 6A. The relaxed system is somewhat analogous to the $H_2^+$ molecular ion (in this case with an additional negative charge between the two attractive centers 69 and 70). The wavefunctions for the excited and ground states of the relaxed center are made up of antisymmetric and symmetric combinations, respectively, of a single-well s-state. The resultant oscillator strength for an electric dipole transition is quite large ($f \sim 0.2 - 0.35$).

Two other important features of $F_A(II)$ behavior are implicit in FIGS. 6A and 6B. First (in the normal configuration), the presence of a foreign ion 71 causes $p_z$ orbitals to be distinguished from $p_x$ and $p_y$, such that the absorption exhibits a characteristic splitting. That is, transitions to the $p_z$ orbitals result in a longer wavelength band that is often well resolved from the main band. As far as laser applications are concerned, this extra band greatly increases the probability of overlap with a convenient pump source.

It should also be noted from FIG. 6B that there is a 50% probability that the halide ion 72 separating the two wells will move into the original $F_A$ center vacancy 68 upon completion of the optical pumping cycle, that is, upon returning to the normal configuration. When such occurs, the $F_A$ center axis will have switched orientation by 90°. Such reorientation effects must be taken into account in the design of $F_A(II)$ lasers. Pumping of the longer wavelength absorption band with light propagating along a 100 axis bleaches that band for the pump light itself. A similar effect occurs when pumping the short wavelength absorption band with light polarized along a {100} axis. This effect is avoided in FIGS. 1, 3, 10 and 11 for $F_A(II)$ centers by cutting and orienting the crystal so that the plane of pump light propagation and polarization included a {110} axis, so that both orthogonally oriented normal states topologically the same as that of FIG. 6A are pumped equally.

The quantum efficiency, $\eta$, of $F_A(II)$ center luminescence in KCl:Li is about 40% for temperatures T $\lesssim$ 77°K, and decreases slowly with increasing temperature until it approaches zero at T $\sim$ 300°K. Nevertheless, laser action has been obtained with the $F_A(II)$ center in KCl:Li for T as high as 200°K; the mechanisms for the non-radiative decay are not yet completely understood. Behavior of $F_A(II)$ centers in other hosts ought to be quite similar, although $\eta(T)$ has not yet been measured for these.

Figure 7:
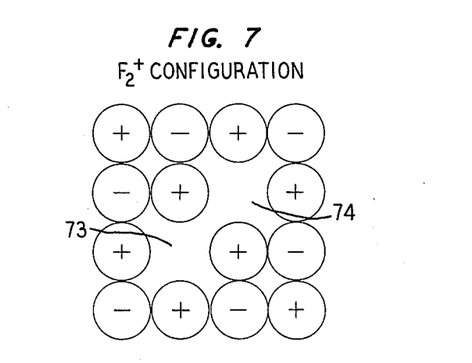
FIG. 7 is a schematic illustration of the crystalline lattice arrangement for an $F_2^+$ color center.

As indicated above, another center highly suitable for laser action is the $F_2^+$. This center consists of a single electron (not shown on the ionic diagram) shared by two adjacent vacancies 73 and 74 for which the ionic configuration is shown in FIG. 7. The arrangement shown there applies to both emission and absorption. For the $F_2^+$ center, relaxation consists merely in a slight increase in separation of the two vacancies 73 and 74. The corresponding Stokes shifts are then quite small, usually just enough to prevent significant overlap of the absorption and emission band. This behavior contrasts sharply with that of the $F_A(II)$, where as already indicated, relaxation involves both a radical change in ionic configuration and a Stokes shift ratio of about five to one between absorption and emission energies.

Figure 8:
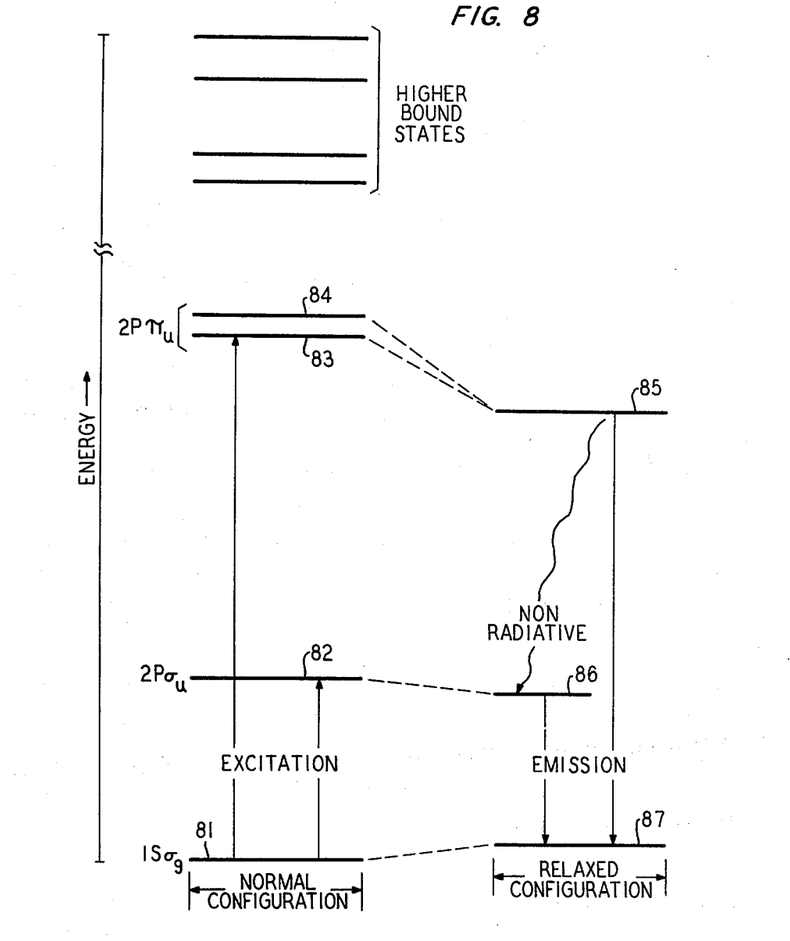
FIG. 8 shows the $F_2^+$ energy level diagram.

However, in their relaxed configurations, the $F_2^+$ and $F_A(II)$ are quite similar in having double vacancies, as seen by comparing FIGS. 6B and 7; and it was this analogy that first led us to consider the $F_2^+$ as a potential laser material. The model of an $H_2^+$ molecular ion embedded in a dielectric continuum seems to fit the $F_2^+$ particularly well. Good quantitative fit has been obtained between that model and the observed spectrum in quite a number of hosts. FIG. 8 shows the $F_2^+$ energy level diagram. The levels there are named after their molecular ion counterparts.

The transition of greatest interest for lasers is that between the ground and first excited states ($1s\sigma_g \rightarrow 2p\sigma_u$), both for excitation as well as for emission. The potential tuning range (0.9 – 2 $\mu$m) cited above was for this emission. When thus excited, quantum efficiency of the emission is temperature independent, and its absolute value is probably 100%, although the absolute value has not yet been measured experimentally. The oscillator strength of the emission is thought to be on the order of $f \sim 0.2$.

On the other hand, the higher energy emission ($2p\pi_u \rightarrow 1s\sigma_g$) is probably not of much practical value for laser action. In the first place, its emission is seriously quenched at all but very low temperatures (T $\lesssim$ 50°K) by competition from the lower energy emission. Secondly, severe overlap of the higher energy pump band with that of the ordinary F-center could lead to the production of F' centers, through a well-known tunneling effect. (The F' is a vacancy containing two electrons. Also, it is essentially impossible to have $F_2^+$ centers without a substantial accompanying population of F-centers.) Unfortunately, the F' centers would absorb strongly photons of the higher emission band.

Perhaps it should be stated explicitly that we know of no color-center species foreign to the $F_2^+$ that would absorb photons of the lower-energy emission band shown in FIG. 8. Also, from FIG. 8 it is clear that the lower energy emission should experience no problems with self-absorption upward from its higher level 86 either because it is far from the conduction band edge and from the next higher level 85. It is believed that a concentration of $1 \times 10^{16}$/cc. of $F_2^+$ centers should be adequate for laser action, although a somewhat higher concentration would be preferred.

Finally, we should point out one further advantage of the $F_2^+$ color center. This advantage resides in a combination of the following: First, the proposed laser transition is strongly polarized along the axis of the center. Secondly, the center axes can all be aligned along one particular {110} axis, and optical pumping of the lower energy band will not affect that alignment. The alignment is illustratively achieved through optical pumping of the parent $F_2$ center with linearly polarized light in its higher energy absorption bands. For example, the $F_2$ center in KCl is aligned by pumping with polarized light of wavelength $\leq$ 540nm. Thus, all the $F_2^+$ centers could contribute with maximum efficiency to a linearly polarized laser mode. When taken together with the small Stokes shift, this property could lead to an energy conversion efficiency for the laser as high as 80%.

Figure 9A:
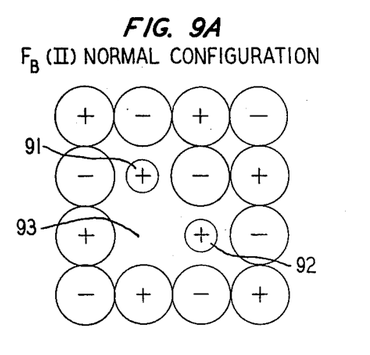
FIGS. 9A and 9B are schematic illustrations of the normal and relaxed configurations of an alkali halide with $F_B(II)$ color centers.
Figure 9B:
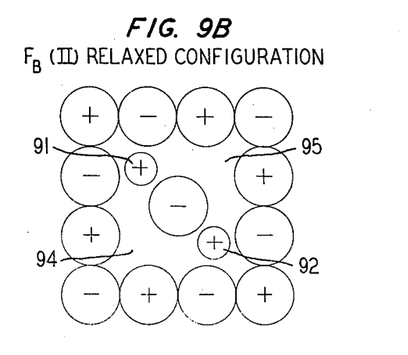

There is at least one more color center type that is promising for laser action, and that is the $F_B(II)$. The ionic configuration of the $F_B(II)$ center is shown in FIGS. 9A and 9B. The $F_B$ centers are quite similar to the $F_A$, except that they involve two foreign metal ions 91 and 92, instead of the single foreign ion of the $F_A$ center. $F_B$ centers are obtained in substantial quantities when the dopant concentration represents at least several percent of all metal ions. In the $F_B(II)$ center, note that metal ions are diagonally aligned with respect to the vacancy or vacancies and the principal directions of ionic alignment. The two vacancies 94 and 95 yield a desirable double well potential characteristic. In contrast, the undesired type I $F_B$ center has the foreign ions lying along a common {100} axis, which is at 45° with respect to that shown for metal ions 91 and 92, and does not yield as desirable a characteristic.

There is a fair chance that $F_B(II)$ centers will allow the laser tuning range to be pushed well into the region $\lambda > 3\mu m$. That is, luminescence photon energies of the type II centers seem to decrease monotonically with increasing lattice size. However, the largest lattice in which $F_A(II)$ centers are known to exist is RbCl. On the other hand, the $F_B(II)$ configuration seems to allow formation in lattices containing heavier ions. Thus, it seems rather likely that type II center formation will be possible in a lattice such as RbBr or perhaps even RbI, for $F_B$ centers whose normal configuration is that shown in FIGS. 9A and 9B.

Figure 10:
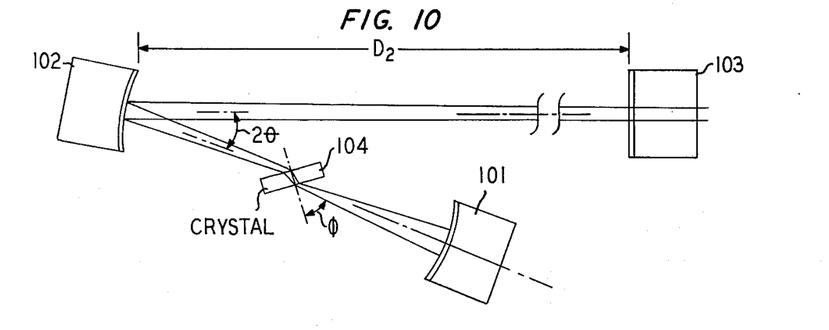
FIG. 10 is a partially pictorial and partially schematic illustration of a modification of the resonator of FIG. 1, with unchanged portions not shown.
Figure 11:
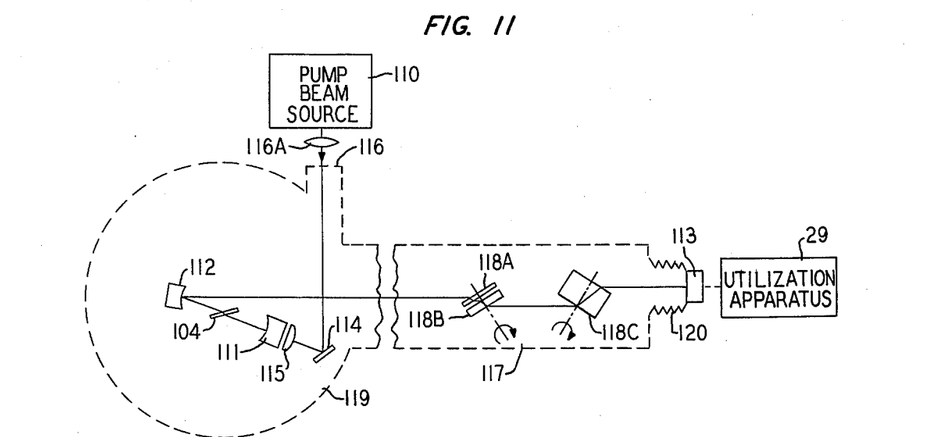
FIG. 11 is a partially pictorial and partially schematic illustration of a more detailed modification of the resonator of FIG. 1.

One of the potential difficulties with the $F_B(II)$ centers is that they are always accompanied by a certain population of $F_A(I)$ and $F_B(I)$ centers. Furthermore, the absorption bands of all three center types tend to overlap rather strongly. However, both the $F_A(I)$ and $F_B(I)$ center axis can be aligned along a common {100} axis by optical pumping with polarized light when the crystal is at or near room temperature; and it is such a crystal that is used when an $F_B(II)$ center laser, for example, that of FIGS. 10 and 11, is to be built. The long wavelength absorption band of both type I centers will then be bleached out for light polarized at right angles to that [100] axis, whereas the $F_B(II)$ centers will continue to absorb for that combination of wavelength and polarization. Thus, selective excitation of the $F_B(II)$ centers can be achieved. Not only will this allow for more efficient use of optical pump power, but it will also avoid the creation of potentially harmful species. That is, optically excited $F_A(I)$ and $F_B(I)$ centers may tend to absorb at wavelengths corresponding to the intended $F_B$ (II) laser emission.

The processes by which the above-mentioned color centers are formed deserve mention. In all cases, ordinary F-centers are created first, usually through the well-known process of additive coloration, or by subjecting the crystal to radiation damage. In general, additive coloration is preferred for the purity of its end product.

The formation of $F_A$, $F_B$, or $F_2$ centers results from a simple aggregation process that can be described as follows: First, thermal ionization of optically excited F-centers results in the formation of pairs of F' centers and empty vacancies. At sufficiently high temperatures (T $\lesssim$ – 50°C), the empty vacancies wander through the lattice until they meet either an F-center or a foreign metal ion. Recapture of an electron (from optically ionized F' centers) by the vacancy then leads to formation of $F_2$ centers in the first instance, or to the formation of $F_A$ or $F_B$ centers in the second.

If the foreign metal ion concentration is several orders of magnitude greater than that of the F-centers, an essentially complete conversion can be carried out, with $F_A$ centers as the exclusive end product. However, the creation of $F_2$ centers cannot be carried to completion without an accompanying creation of higher aggregates, such as $F_3$ and $F_4$, which need not be explained here as to configuration. Thus, the optimum conversion to $F_2$ will necessarily involve a finite residue of F-centers.

$F_2$ centers are converted to $F_2^+$ by subjecting the $F_2$ centers to ionizing radiation. The conversion is permanent if suitable traps have been provided for the excess electron. A number of successful schemes for making such traps are known.

Finally, we should mention the U center, which is an $H^+$ ion trapped at an anion vacancy. U centers are usually formed by baking a crystal already containing F-centers in an atmosphere of $H_2$. The U centers absorb only in the hard U.V. and they are very stable. They can be converted back into F-centers either by pumping them with U. V. or by gentle X-raying of the crystal. This process of temporarily "storing" F-centers as U centers is quite helpful in the manufacture of laser quality crystals.

The modified embodiment of FIG. 10 is based on the dye laser art. In cw dye lasers, the modal beam is highly concentrated in the region of the dye cell. The beam is focused by reflectors 101 and 102 to a diffraction limited spot, called the beam waist, whose diameter is typically on the order of 10 $\mu$m. This small spot size allows the pump beam also to be highly concentrated, such that a power of, say, 1 watt can produce a pump intensity in the region of the dye cell on the order of $10^6$w/cm$^2$. In addition to allowing for the maximum possible concentration of pump power, such tightly focused, coaxially pumped cavities are energetically highly efficient, since practically all the incident pump power can be absorbed in a volume of the amplifying medium that is coincident with that swept out by the laser mode itself.

Such focused-beam cavity designs are also quite suitable for use in a color center laser. For the most part one needs merely to substitute a thin slab of colored crystal 104 for the dye cell. Otherwise, the technology that has developed around such cavity designs can be taken over more or less wholesale. The pumping laser medium (not shown) is typically, though not necessarily, disposed between reflectors 102 and 103.

In FIG. 10 the amplifying crystal 104 is located in the neighborhood of the beam waist, as shown. The angle $\phi$ is Brewster's angle, such that reflection loss at the crystal surfaces (for a mode whose electric field is in the plane of the paper) can be avoided without the necessity for antireflection coating them; this is a big advantage for the color center device, where the necessity to add antireflection coatings would pose difficulties in crystal handling. Another very important feature of this design is that the astigmatism induced by mirror 102 can be made to exactly compensate for the astigmatism created by rotation of the crystal to Brewster's angle. This compensation can be accomplished through adjustment of the reflection angle $2\theta$. Without this compensation, it would be impossible to reduce the beam waist below a certain critical size, and still maintain a stable laser mode.

The laser mode itself can be described as follows: The beam waist, of radius $W_O$, is located almost exactly at the center of curvature of mirror 101, and just a little outside the focal length $f$ of mirror 102. When the output mirror 103 is a flat, the modal beam has its largest diameter ($2W_1$) at mirror 102, and slowly tapers down to a second beam waist, of diameter $\sqrt{2}\,W_1$, at the output mirror 103. However, since one usually has $d_2 >>> 2W_1$, for all practical purposes, the mode consists of an essentially parallel beam in the region between 102 and the output mirror 103. This region of parallel light constitutes yet another important feature of the cavity design, since it greatly facilitates the insertion of tuning elements and other intracavity devices. where The cavity of FIG. 10 has been described quantitatively in great detail by Dienes et al. in U.S. Pat. No. 3,731,224, cited above. The most important results of their paper can be summarized as follows: The mode is said to be stable as long as $W_1$ is of finite size. Let us define $\delta$ such that $$d_1 \equiv r_1 + f + \delta \qquad (3)$$

where $r_1$ is the radius of curvature of 101. A stable mode will be obtained as long as $\delta$ lies within the range $$0 \leq \delta \leq f^2/d_2 \equiv 2S. \qquad (4)$$

The quantity of $2S$ is known as the stability range. The confocal parameter, $b$, is defined as the distance between points along the beam path where the mode diameter is $\sqrt{2}$ times that obtaining at the beam waist. One always has $$b = 2\pi W_0^2/\lambda. \qquad (5)$$

When the cavity is adjusted to the middle of its stability range, one also has $$b \cong f^2/d_2 = 2S. \qquad (6)$$

By combining Equations (5) and (6), one can calculate $W_O$:

$$W_0 = f \sqrt{\frac{\lambda}{2\pi d_2}}. \qquad (7)$$

Yet another important quantity is the far-field angle $\phi$, which can be calculated as $$\phi = \frac{\lambda}{\pi W_0} \qquad (8)$$

and from which $W_1$ can be calculated as $$W_1 \cong f\phi. \qquad (9)$$

Finally, the astigmatic compensation mentioned above will be obtained whenever the relation $$f \sin\theta \tan\theta = t(n^2-1)\sqrt{n^2+1/n^4} \qquad (10)$$

is satisfied, and where $t$ and $n$ are the crystal thickness and index of refraction, respectively.

Kogelnik et al. also discuss the nature of the mode shape inside the amplifying medium. Although in general the behavior is quite complicated, they find that for the case $S >> t$, the beam waist area A is given by the expression $$A \cong \pi n W_0^2 \qquad (11)$$

whereas for the case $S << t$, they obtain $$A \cong \lambda t(n^2-1)/[n^3\sqrt{n^3+1}]. \qquad (12)$$

In this section we shall develop some useful formulas for the optical gain, or amplification that can be attained in a four-level system such as the F and F-like centers. Not only will these formulas prove useful in the description of working lasers, but also they will allow us to conclude the general discussion of the suitability of various center types for practical laser action.

As already indicated above, the optical pumping cycle of F and F-like centers consists of four steps: excitation, relaxation, luminescence, and relaxation back to the ground state of the normal configuration (see FIG. 2). Since both relaxation times $\tau_R$ and $\tau_R'$ are very short ($\tau_R$ and $\tau_R' \leq 10^{-12}$ sec.) with respect to the luminescence decay time $\tau_l$, the only populations of any significance are N and N*, i.e., those of the ground and relaxed-excited states, respectively. Thus, population inversion of the luminescence levels is obtained at any finite pump rate, and in this limited sense, any F or F-like center forms an ideal four-level system.

But one must also consider the possibility of absorption at the luminescence frequency. That is, in the Beer's law expression for the net optical gain:

$$G \equiv I_{out}/I_{in} = e^{\alpha z} \qquad (13)$$

where $z$ is the gain path length, the net gain coefficient is the sum of two terms, $$\alpha = \alpha_o - \alpha_l \qquad (14)$$

where $\alpha_o$ is the coefficient calculated for the inverted luminescence levels alone, and where $\alpha_l$ is the coefficient of absorption loss. Of course, only when $\alpha_o > \alpha_l$ can there be a net gain.

Even when the unexcited crystal is perfectly transparent at the luminescence frequency, there sometimes exists the possibility that the optical pumping will create a new and absorbing species. Such occurs, for example, with those centers retaining the vacancy configuration in the relaxed-excited state, such as the F and $F_A(I)$. As already indicated hereinbefore, one new species is the relaxed-excited state itself, since absorption at the luminescence frequency from the relaxed-excited state into the conduction band is a distinct possibility. Such absorption from the relaxed-excited state of the ordinary F center has been measured for slightly lower photon energies, and it has been found to be quite large. For the case of optically pumped F and $F_A$ and $F_A(I)$ centers, whenever $N \geq 10^{16} - 10^{17}/cm^3$, $F'$ centers are formed in significant quantities. These constitute yet another absorbing species, since the $F'$ absorption band severely overlaps the F luminescence band.

In contrast, the above problems are essentially nonexistent for centers having a double well relaxed-excited state. In the first place, the separation between the relaxed-excited state and the lower edge of the conduction band is greater than the luminescence photon energy. Also, there is no overlap between the $F'$ absorption and the luminescence band. With a tunable laser using the $F_A(II)$ center in KCl:Li, we have on occasion seen evidence for an absorption at the extreme long wavelength edge of the luminescence band, but this mysterious absorption can be eliminated through proper treatment of the crystal.

For a Gaussian band of full width at the half power points $\delta \nu$, the gain coefficient at the band peak, $\alpha_o$, can be calculated from the well-known formula $$\alpha_o = \frac{N \lambda_o^2 \eta}{8 \pi n^2 \tau_l} \cdot \frac{1}{1.07 \, \delta \nu} \qquad (15)$$

where $\lambda_o$ is the wavelength at the band center, $n$ is the host index, $\eta$ is the quantum efficiency of luminescence, and $\tau_l$ is the measured luminescence decay time.

The gain formula (15) represents an extremely useful form, and one that affords maximum insight. In the first place, it contains only experimentally measurable quantities, with the sole exception of N*. Furthermore, in general, N* is not limited by the pump, since extremely high intensity sources are now available. Instead, the limitation in N*, if any, is created by other factors, such as a rapid increase of interaction among centers with increasing concentration. From this point of view, it is more revealing to display N* directly, rather than to express it in terms of a pump intensity.

In keeping with the above philosophy, let us compare the gain coefficients possible with various color center types for a fixed value of N*. In Table I we show values of $\alpha_o$ calculated from Equation (15) for the F and $F_2^+$ centers in KCl, and for the $F_A(II)$ center in KCl:Li. In each case, $n = 1.49$ and $T = 77°K$. Note that $\alpha_o$ is two orders of magnitude smaller for the F center than for the other centers. This difference reflects the combined effects of an approximately 22 times smaller oscillator strength and a roughly 4 times larger $\delta \nu$ for the F center.

The gain figure of Table I for the ordinary F center is ominously small in absolute magnitude. In the first place, only a rather small absorption would bring the net gain to zero; several possible sources of such absorption have already been pointed out. In the second place, such a small gain coefficient tends to rule out the possibility of using a coaxial pumping scheme, where the effective gain path length is the reciprocal of the pump band absorption coefficient. That is, for F centers pumped somewhere near the absorption band peak, the gain path would always be too short to allow for a reasonable gain.

Although it is not as fundamental as Equation (15), we shall have use for an equation that expresses the gain as a function of pump intensity. Since the pump rate out of the ground state is equal to the photon absorption rate, we may write $$NW = \beta \frac{I}{E_p} \qquad (16)$$

where $W$ is the pump rate, $\beta$ is the absorption coefficient at the pump wavelength, $E_p$ is the pump photon energy, and $I$ is the pump beam intensity. We may then write further:

$$N = NW\tau_l = \beta \frac{I}{E_p} \tau_l \qquad (17)$$

Finally, substituting (17) into (15) we obtain, $$\alpha_o = \frac{1}{8\pi} \frac{\lambda^2}{n^2} \frac{\eta}{(1.07 \, \delta \nu)} \frac{\beta I}{E_p} \qquad (18)$$

For a coaxially pumped system, where one can assume a variation of the gain coefficient of the form $$\alpha = \alpha_o e^{-\beta z} \qquad (19)$$

and if furthermore, the gain path is long with respect to $\beta^{-1}$, then it is easy to show that $$G = e^{\alpha_0 l/\beta}. \quad (20)$$

Equations (18) and (19) may be combined to yield $$\ln(G) = \frac{1}{8\pi} \frac{\lambda^2}{n^2} \frac{\eta}{(1.07\, \delta\nu)} \frac{I}{E_p}. \quad (21)$$

TABLE I

| QUANTITY | F | $F_2^+$ | $F_A(II)$ | UNITS |
|---|---|---|---|---|
| $\lambda_o$ | 1.0 | 1.68 | 2.7 | $\mu$m |
| $\tau_{\parallel}\eta$ | 600 | 200 | 200 | nsec |
| $\delta\nu$ | 6.3 | 1.69 | 1.45 | $10^{13}$Hz |
| $\alpha_o$ | 0.004 | 3.5 | 4.2 | cm$^{-1}$ |

In FIG. 10 and also in FIG. 11, the basic cavity configuration is that described in the preceding paragraphs, with the following parameters: radius of curvature of reflector 102 or 112 and 101 or 111, distance from crystal 104 = 25mm, $d_2$ = 600mm, thickness of crystal 104 = 1.72mm, and $2\theta$ = 20°.

For operation with the $F_A(II)$ centers of KCl:Li and RbCl:Li, the pump source was a krypton ion laser 110 operating at 6471 A. Both input and output mirrors 111 and 113 were of the multilayer dielectric type. Thus, it was possible for the input mirror to be a high reflector (R ~ 100%) for the wavelengths in the $\lambda$ = 2.7 $\mu$m band, and at the same time to have rather high transmission at the pump wavelength. The intermediate mirror 112 was coated with evaporated gold. A simple lens 115 located immediately behind reflector 111 served to bring the pump beam to a focus at the crystal 104. Actually, it was also necessary to use a second, very weak lens located just outside the pump beam input window 116 in order to achieve perfect focus, but this allowed for very convenient external adjustment of both the pump beam position as well as its focus.

The crystal slab 104 was held against a Cu cold finger with a gentle spring clamp, as shown in FIGS. 2A and 2B for crystal 11. No grease or other thermally conductive compound was used, in order not to strain or fracture the crystal by differential thermal contraction. Despite the rather poor thermal contact between the crystal and cold finger, cw pump inputs as high as ~200 mw could be tolerated without undue heating of the crystal.

For an $F_A(II)$ center laser, the two opposing large faces of the crystal 104 were {100} planes. The crystals were oriented such that the plane of the paper in FIGS. 10 and 11 contained a 110 axis. Since the pump beam was also polarized in this plane, both sets of centers whose axes lay in the plane of the slab were pumped equally. Also, due to the Brewster's angle orientation, the laser beam traversed the crystal at a considerable angle (36°) to the slab normal, and hence centers whose axes lay along that direction were also pumped. In this way it was possible to avoid bleaching the crystal, even though the long wavelength absorption band was used for pumping. A second advantage of the {110} orientation was that it prevented strain-induced birefringence from affecting the laser mode, since such strains tended to lie along the {110} axis.

The laser crystals were prepared as follows: Slabs 104 of the desired thickness were cleaved out of a crystal containing about $10^{18}$ U centers/cm$^3$. The two opposing large faces of the crystal were then optically polished with Linde B and pure ethanol on a wool velvet lap. The transparency of the U center crystal greatly facilitated inspection for surface flaws, strain-induced birefringence, and other possible defects. A fraction of the U centers were then converted into ordinary F centers by subjecting the crystal for about 10 min. to 50 kv X-rays with beam current of 17 ma, crystal located ~ 2 cm from the anode. The resultant F center concentration was ~ 1 - 2×10$^{17}$/cm$^3$. Immediately following X-ray treatment, the crystal was loaded into the laser vacuum chamber 117 and cooled to about −30°C. The F centers were then converted into $F_A(II)$ centers by optically pumping the F band for nearly one hour or more. It was found necessary to obtain very complete conversion, since optically excited F centers are rather strong absorbers in the $F_A(II)$ luminescence band. Finally, the crystal was cooled to 77°K for laser operation.

Tuning was illustratively accomplished with a set of sapphire birefringence plates 118A-C, as shown in FIG. 11. These plates were oriented at Brewster's angle with respect to the beam. The optic axis of each lay in the plane of the plate. A simple mechanical linkage (not shown) allowed all three plates to be rotated simultaneously about their normal axes. In this way it was possible to tune the KCl:Li $F_A(II)$ laser smoothly and continuously over the full range 2.5 ≤ $\lambda$ ≤ 2.9 $\mu$m with rotation of a single knob.

Space does not permit an extensive discussion here of the birefringence tuner 118A-C, but a rather complete description has been given recently in the literature in the article by A. L. Bloom, *Journal of the Optical Society of America*, 64, 447 (1974). The essential principle of the tuner is this: in general, a linearly polarized mode is made elliptically polarized by the plates 118A-C, and a large reflection loss results. However, there exists one wavelength for which the linear mode polarization is unaffected, and there is no loss; laser action then occurs at this favored wavelength. One can easily show that the lasing wavelength varies with plate rotation angle $\theta_0$ as $$\lambda = \lambda_p (1 - \cos^2\phi \cos^2\theta_0) \quad (22)$$

where $\phi$ is Brewster's angle and where $\lambda_p$ is a constant determined by the plate thickness and birefringence constants. For sapphire, $\phi$ = 60°, or $\cos^2\phi$ = 0.25, such that a practical tuning range a little less than 25 percent wide is possible with a single set of plates 118A-C.

The entire cavity 111, 112, 113 was preferably surrounded by a vacuum enclosure 117, as indicated by the dashed lines of FIG. 11. The vacuum was employed for two reasons, first, to provide thermal insulation for the crystal, and secondly, to prevent atmospheric absorption (especially from H$_2$O) from interfering with laser operation. The cylindrical can 119 surrounding the crystal 104 and spherical mirror section 111, 112 was open at the top (toward the viewer), and the vacuum seal was completed by a removable liquid nitrogen storage can. The output mirror 113 was mounted on a flexible metal bellows 120, to allow for angular adjustment during laser operation, but the two spherical mirrors 111 and 112 had to be prealigned.

The cavity was prealigned with the aid of a $\lambda$ = 5682A krypton ion laser line from source 110, suitably adapted, for which wavelength the mirrors were rather good reflectors. A dummy (transparent) crystal 104' (not shown) of like dimensions and index to crystal 104 was inserted into the cavity for this purpose. With the aid of this visible light, the limits of the cavity stability range could be found easily and rapidly, and the mirrors 111, 112 and 114 set into proper angular adjustment. Usually no further adjustment was required for obtaining laser action after such prealignment, except perhaps for a slight touch-up of the output mirror 113 and pump beam input steering lens 116A.

In order to measure the gain capabilities of the KCl:Li laser, the usual high-reflectivity output mirror 113 was replaced with one having R = 50%. In this way the unknown intracavity losses would be overwhelmed by the huge output transmission loss. In this experiment, threshold for laser action (at band center) occurred at an input pump power, P, to the crystal of 130 mw. At threshold, the gain (for a double pass through the crystal) just compensates for the total cavity loss. Thus a single pass gain of $\sqrt{2} = \exp(0.346)$ was implied. This measured gain is to bbe compared with that calculable from Equation (6).

To make that calculation, first we must estimate the pump intensity, I. From Equations (6) and (7) and the cavity parameters listed above, we obtain $b = 1.02$mm and $W_0 \cong 20$ $\mu$m. Since the conditions for Equation (12) are better satisfied than those for Equation (11), we estimate the mode beam cross section from Equation (12) as $A = 0.83 \ 10^{-5}$cm$^2$. By making the further assumption that pump beam was well matched in size to the modal beam, we may estimate the pump intensity I from the modal area and the threshold pump power of 130 mw. Then from Equation (2), we finally calculate $\ln G = 0.39$, in excellent agreement with the measured value.

When a high reflectivity output mirror 113 (T = 1.6%) was used, the pump power at threshold dropped to 14 mw. Since ln G is directly proportional to the pump power, a value of ln G = 0.037 is implied by extrapolation from the previous experiment. Hence the total cavity loss was 2×0.037 = 7.4%, of which 1.6% represents output coupling, and the remaining 4.8% is the intracavity loss. Since we were not able to measure the individual mirror reflectivities, an exact accounting of the intracavity loss is impossible.

The maximum energetic efficiency of the KCl:Li laser should be about 10%, since the ratio of pump to luminescence photon energies is 5, and only about one-half the centers will be oriented such that they can radiate into a linearly polarized laser mode. This figure must be further multiplied by the ratio of output mirror transmission to total cavity loss. Thus, with T = 1.6% and the loss of 7.4% cited above, our laser should have had an energetic efficiency, when operated far above threshold, of approximately 0.1×1.6/7.4 = 2.2%.

Figure 12:
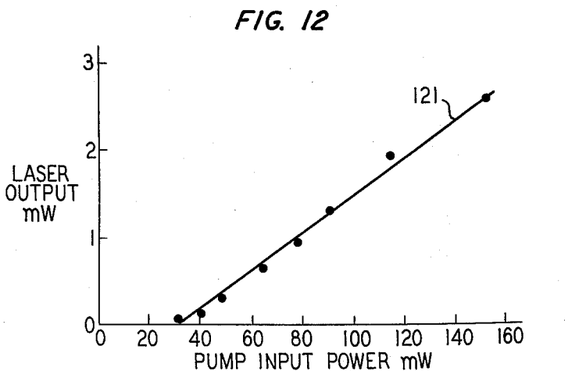
FIGS. 12–14 shown curves useful in explaining the operation of the invention.

FIG. 12 contains curve 121, a graph of laser output power as a function of pump input for operation with the 1.6% transmission output mirror 113. The behavior shown there is consistent with the above efficiency estimate.

Figure 13:
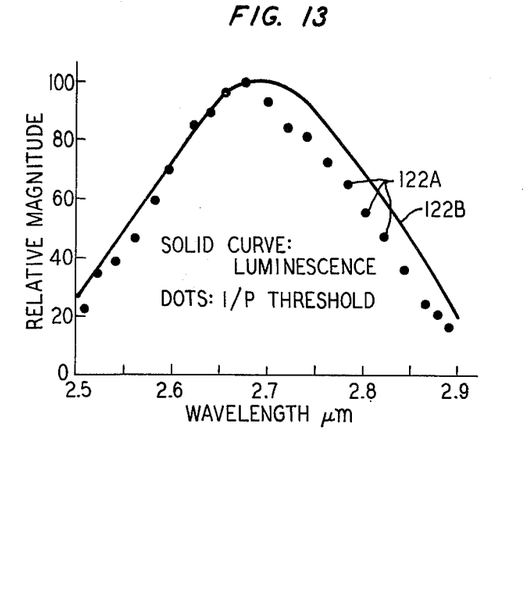

In FIG. 13, the reciprocal of the pump power required at threshold, $P_{th}^{-1}$, is plotted in curve 122A as a function of laser wavelength. Ideally, this curve 122A should have the same shape as the luminescence band, curve 122B. However, the deviation between the two curves indicates the existence of an absorption in the crystal 104 that increases in strength with increasing wavelength. In fact, the laser often could not be made to function for $\lambda \geq 2.8$ $\mu$m, and the data of FIG. 13 represent the best attainable behavior. The improved performance could always be attained by heating the crystal to T = −30°C, and intensely pumping it for 20 or 30 minutes before cooling it down again for laser operation. It would be most interesting and helpful if the origin of this sporadic and annoying absorption could be identified.

Figure 14:
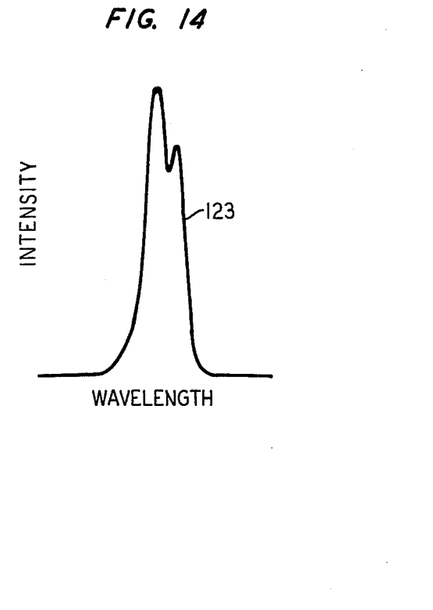

In FIG. 14, curve 123 gives some indication of the spectral purity of the laser output. We have chosen to illustrate the worst case, i.e. that obtaining when the laser is operated far above threshold. Each of the two peaks in FIG. 14 probably represents the response of the grating instrument to a $\delta$ function in frequency; hence, we probably have simultaneous operation on two closely spaced mode frequencies. It may be that true single frequency operation can be attained through better mutual adjustment of the sapphire birefringence plates, but if not, such single frequency operation can always be attained through addition of an intracavity etalon.

Despite the early stage of development, the performance of the KCl:Li laser just described is quite promising. More efficient mirrors and a somewhat higher output mirror transmission would greatly increase its energetic efficiency. Tuning has been accomplished over the full-range lying between the 25% power points of the luminescence band; this is not always possible with organic dyes. And with its static amplifying medium, crystal 104, as opposed to a rapidly flowing and turbulent dye solution, the color center device of FIG. 11 is inherently capable of much better frequency definition and stability.

Although we have spoken mainly of KCl:Li in the above account of laser experiments, it should be mentioned that we have also obtained quite satisfactory operation with RbCl:Li as well. At the time of this writing, experiments to test the $F_2^+$ as a laser material are in the preparation stage. The host lattice will be KCl with $F_2^+$ centers, described hereinbelow, for the first test. The pump source 110 will be a Nd:YAG laser operating at 1.34 $\mu$m. The cavity configuration will be essentially that just described for the $F_A(II)$ center device of FIG. 11. In other words, FIG. 11 is modified as just described for my preferred form of $F_2^+$ laser.

Among the modifications that are desirable for the foregoing embodiments for particular applications are almost any of the optical resonator configurations currently usable with dye lasers operating in the visible portion of the spectrum. For example, highly efficient three-reflector resonators are available to overcome the astigmatism associated with a high degree of focusing of the pumping and stimulated beams in the crystal. Such resonators also reduce loss associated with the introduction of a birefringent plate or etalon for tuning. Thus, the diffraction grating can be eliminated.

Figure 15:
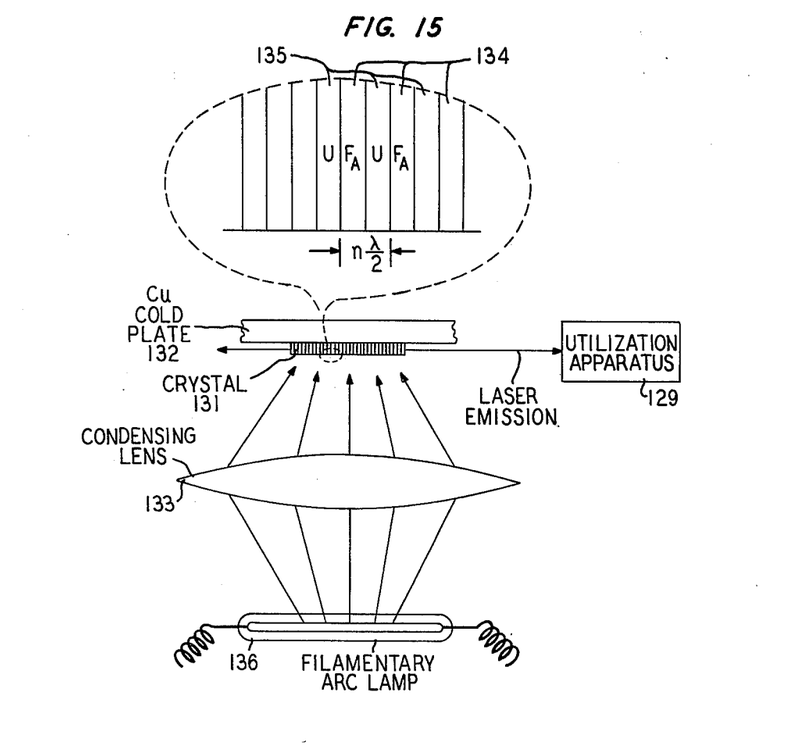
FIG. 15 shows a partially pictorial and partially block diagrammatic illustration of another embodiment of the invention employing distributed feedback.

For certain applications, such as pollution monitoring, it would be desirable to have a very inexpensive laser that would be fixed-tuned to a predetermined frequency, such as a prominent absorption line of a given molecular species. FIG. 15 suggests one way that such a device might be made from color centers. It would make use of the principle of distributed feedback. That is, if either the index $n$ or the gain coefficient $\alpha$ is modulated spatially with period $d$, there will be strong feedback at those wavelengths that satisfy the Bragg condition:

$$n\lambda = 2d \qquad (23)$$

without the need for external mirrors.

The device shown in FIG. 15 would use a modulation of $\alpha$ itself, obtained by means of a periodic variation in the $F_A$ center concentration. The required "grating" could be written into the KCl:Li or other similar crystal 131 by taking advantage of the photochromic conversion process U → F and subsequent conversion to $F_A(II)$ in regions 134. The beam of an ultraviolet laser could be split and made to interfere with itself to form an interference pattern of the desired period. Regions 134 would be defined by regions of highest radiation intensity in the forming interference pattern. Remaining U regions 135 would occur at regions of destructive interference or radiation nulls. The exposure technique is a well-known one that has been used rather extensively to write gratings into certain photochromic plastic materials.

The principle of distributed feedback has been given rather extensive treatment by Kogelnik et al. in their U.S. Pat. No. 3,760,292, above cited. They show that the product $\alpha l$ must be of the order unity, where $l$ is the total gain pathlength in order to have oscillation when pure gain modulation is used. For $l$ on the order of a few cm, the pump intensity required would be on the order of 30 – 100 w/cm². Such intensities ought to be obtainable from an arc lamp, at least on a pulsed basis. For the desired positive distributed feedback each pair of regions 134 and 135 has a combined width equal to an odd multiple of half-wavelengths, where $\lambda$ is the wavelength of light to be stimulated.

Further, the relatively high concentration of $F_A(II)$ centers in regions 134 and the degree of focusing of the pumping light from souce 136 by lens 133 can be considerably relaxed in the embodiment of FIG. 3, as compared to the relatively high degree of focusing in FIG. 1, as the guiding pathlength $l$; orthogonal to stripe-like regions 134 and 135 in crystal 131 is lengthened.

The above-described arrangement is illustrative of the application of the principles of the invention. Other embodiments may be devised by those skilled in the art without departing from the spirit and scope thereof.

For example, I now appreciate that principal features of my invention are potentially applicable to a broad class of F-type centers, other than ordinary F-centers. In particular, in addition to the $F_A(II)$, $F_B(II)$ and $F_2^+$ center lasers disclosed and claimed above, it is now felt that an $F_2$ center laser may be feasible if further investigation shows that an active medium including such centers has a sufficiently low self-absorption for the stimulated radiation.

I claim:

1. Apparatus for the stimulated emission of radiation of the type comprising a body of an alkali halide crystal having color centers capable of substantial absorption of a particular band of radiation, means for supplying the band of radiation to the crystal to produce a population inversion between radiatively coupled energy levels, and means including reflective surfaces associated with the crystal for stimulating the emission of coherent radiation from the inverted population of color centers, characterized in that the apparatus includes means for cooling the crystal by conduction from the crystal, said cooling means including a substantial solid body contacting said crystal and providing an optical path within said body of negligible loss for the stimulated radiation.

2. Apparatus according to claim 1 in which the body of an alkali halide is a body of potassium chloride (KCl), said body containing at least $1 \times 10^{17}$ $F_A(II)$ color centers per cubic centimeter of the type associated with a lithium ion as one of the six nearest neighbors.

3. Apparatus according to claim 1 in which the solid body contacting the crystal comprises a metallic heat sink in contact with a major surface of said body, said heat sink having an opening therethrough in alignment with a direction of Brewster-angle propagation of the stimulated radiation in said body, and means including a spring clip for providing a centered slip-fit mounting of said body on said heat sink.

4. Apparatus according to claim 3 in which the cooing means includes a vacuum chamber, the body of potassium chloride being mounted on the metallic heat sink within said vacuum chamber.

5. Apparatus according to claim 1 in which the body of an alkali halide is a fiber-like body disposed on a dielectric substrate not containing color centers competitive with those in the fiber-like body.

6. Apparatus according to claim 5 in which the body of alkali halide has predominantly $F_A(II)$ centers caused by either of the impurities $Li^+$ or $Na^+$.

7. Apparatus of the type claimed in claim 1 in which the body of alkali halide has at least one crystalline {110} axis and has predominantly $F_2^+$ centers having all their axes aligned along said one {110} axis of said body, and in which the means for pumping the body comprises a source of radiant energy substantially completely of photon energy no greater than that within the lowest energy absorption band of said $F_2^+$ centers.

8. Apparatus of the type claimed in claim 1 in which the body of alkali halide has in addition to the selected color centers the potentially interfering $F_A(I)$ and $F_B(I)$ centers and has a substantial concentration, greater than $1 \times 10^{18}$ per cubic centimeter, of the selected $F_B(II)$ centers that predominate over said $F_A(I)$ and $F_B(I)$ centers, said body having at least a {100} axis along which said $F_A(I)$ and $F_B(I)$ centers are aligned, and in which the means for pumping the body comprises a source of radiant energy polarized substantially at right angles to said {100} axis.

9. Apparatus of the type claimed in claim 8 in which the body of alkali halide is selected from the group consisting of RbBr and RbI.

10. Apparatus of the type claimed in claim 1 in which the body of alkali halide and the means for stimulating the emission from the inverted population mutually comprise alternating regions of U centers and the active color centers, said U center regions including excess hydrogen to render the body colorless therein, said active center regions and said U center regions having widths orthogonal to their interfaces equal to odd multiples of the wavelength of said emission to provide a distributed feedback effect.

11. Apparatus for the stimulated emission of coherent radiation comprising a body of an alkali halide containing a substantial concentration of color centers, said color centers being one type selected from the group of types of color centers consisting of $F_A(II)$, $F_2^+$ and $F_B(II)$, means for providing heat transfer from said body primarily by solid-state contact, means for exciting said body to provide a population inversion therein by absorption by said selected color centers including means for pumping said body with radiant energy predominantly within the absorption bands of said selected color centers, and means for variably resonating emission from the inverted population to stimulate the coherent radiation.

12. Apparatus of the type claimed in claim 11 in which the body of alkali halide is oriented to have a {110} axis at an acute angle with respect to the pump beam direction and lying in the plane defined by the pump beam direction and polarization to pump equally centers of one type and two orthogonal orientations.

13. Apparatus for the stimulated emission of coherent radiation comprising a body of potassium chloride containing lithium as an impurity, said body containing at least $1 \times 10^{17}$ color centers per cubic centimeter of type $F_A(II)$, means for cooling said body, including a copper heat sink and means for providing a slip-fit mounting of said body to said heat sink with its thinnest dimension being in a direction at Brewster's angle with respect to the laser axis, means for continuously pumping said body in its red absorption band attributable to $F_A(II)$ centers to provide a population inversion in said body, and means for stimulating the emission of coherent radiation from said body, including a resonator including first and second nearly concentrically-spaced focusing reflectors the first of which partially transmits the pump light and the second of which partially transmits the infrared light, and disposed beyond the second of said reflectors, a focusing lens and a diffraction grating rotatable about an axis orthogonal to the laser axis and parallel to the grating plane to promote adjustment of the oscillation frequency.

14. An optical device of the type comprising a body of an alkali halide having active color centers therein and means for supplying light of well-defined frequency to said body to yield light of another well-defined frequency, said device being characterized by alternating regions of U centers and the active color centers, said U center regions including excess hydrogen to render the body colorless therein, said active center regions and said U center regions having widths orthogonal to their interfaces equal to odd multiples of the wavelength of said emission to provide a distributed feedback effect.

* * * * *